US008638938B2

(12) United States Patent
Dare

(10) Patent No.: US 8,638,938 B2
(45) Date of Patent: Jan. 28, 2014

(54) SYMMETRIC KEY SUBSCRIPTION

(75) Inventor: Peter Roy Dare, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 1309 days.

(21) Appl. No.: 12/048,336

(22) Filed: Mar. 14, 2008

(65) Prior Publication Data

US 2008/0232594 A1 Sep. 25, 2008

(30) Foreign Application Priority Data

Mar. 22, 2007 (GB) .................................. 0705494.3

(51) Int. Cl.
*H04L 9/00* (2006.01)
(52) U.S. Cl.
USPC ............................ 380/277; 380/278; 380/259
(58) Field of Classification Search
USPC ............................ 380/44, 259, 260, 277–279
See application file for complete search history.

(56) References Cited

U.S. PATENT DOCUMENTS

| | | | |
|---|---|---|---|
| 6,185,685 B1 * | 2/2001 | Morgan et al. ................ | 713/183 |
| 7,146,009 B2 * | 12/2006 | Andivahis et al. ............ | 380/277 |
| 2003/0021416 A1 * | 1/2003 | Brown et al. ................ | 380/277 |
| 2003/0081785 A1 * | 5/2003 | Boneh et al. ................ | 380/277 |
| 2003/0108206 A1 * | 6/2003 | Diehl et al. ................ | 380/277 |
| 2003/0174842 A1 * | 9/2003 | Challener ................ | 380/277 |
| 2004/0022390 A1 * | 2/2004 | McDonald et al. ........... | 380/277 |
| 2004/0172535 A1 | 9/2004 | Jakobsson et al. | |
| 2004/0268126 A1 * | 12/2004 | Dogan et al. ................ | 713/171 |
| 2005/0180572 A1 * | 8/2005 | Graunke ................ | 380/277 |
| 2007/0014398 A1 * | 1/2007 | Eldridge et al. .............. | 380/44 |
| 2008/0095368 A1 * | 4/2008 | Iida et al. ................ | 380/259 |

* cited by examiner

*Primary Examiner* — Nirav B Patel
(74) *Attorney, Agent, or Firm* — Schmeiser, Olsen & Watts, LLP; John Pivnichny

(57) ABSTRACT

A method and system for symmetric key subscription. A register R issues to a subject A a possession that stores a first symmetric key X or comprises a deriving means configured to derive the first symmetric key X. The register R receives from a counterparty B a request for a subscription to a symmetric key with respect to the subject A. In response to the received request, the register R derives a second symmetric key Y from both the first symmetric key X and a first value N. The register R transmits to the counterparty B the second symmetric key Y derived by the register R.

22 Claims, 6 Drawing Sheets

SYMMETRIC KEY SUBSCRIPTION

FIELD OF THE INVENTION

The invention relates generally to the field of cryptography and in particular to a method and a system for subscribing to a symmetric key.

BACKGROUND OF THE INVENTION

When a counterparty 'B' wishes to subscribe to a symmetric key with respect to a subject 'A', it is a problem to prevent counterparty 'B' from impersonating the subject 'A' to other counterparties 'B' and to a register 'R'.

SUMMARY OF THE INVENTION

The present invention provides a method for symmetric key subscription, said method comprising:

issuing, by a register R to a subject A, a possession that stores a first symmetric key X or comprises a deriving means configured to derive the first symmetric key X;

receiving, by the register R from a counterparty B, a request for a subscription to a symmetric key with respect to the subject A;

generating, by the register R in response to the received request, a second symmetric key Y derived from both the first symmetric key X and a first value N; and transmitting, by the register R to the counterparty B, the second symmetric key Y generated by the register R.

The present invention provides a computer system comprising a processor and a computer readable memory unit coupled to the processor, said memory unit containing program code that when executed by the processor implements a method for symmetric key subscription, said method comprising:

issuing, by a register R to a subject A, a possession that stores a first symmetric key X or comprises a deriving means configured to derive the first symmetric key X;

receiving, by the register R from a counterparty B, a request for a subscription to a symmetric key with respect to the subject A;

generating, by the register R in response to the received request, a second symmetric key Y derived from both the first symmetric key X and a first value N; and transmitting, by the register R to the counterparty B, the second symmetric key Y generated by the register R.

The present invention provides a computer program product, comprising a computer usable storage medium having a computer readable program code stored therein, said computer readable program code containing instructions that when executed by a processor of a computer system implement a method for symmetric key subscription, said method comprising:

issuing, by a register R to a subject A, a possession that stores a first symmetric key X or comprises a deriving means configured to derive the first symmetric key X;

receiving, by the register R from a counterparty B, a request for a subscription to a symmetric key with respect to the subject A;

generating, by the register R in response to the received request, a second symmetric key Y derived from both the first symmetric key X and a first value N; and transmitting, by the register R to the counterparty B, the second symmetric key Y generated by the register R.

The present invention provides a process for providing a symmetric key subscription service, said process comprising implementing a method for symmetric key subscription, said method comprising:

issuing, by a register R to a subject A, a possession that stores a first symmetric key X or comprises a deriving means configured to derive the first symmetric key X;

receiving, by the register R from a counterparty B, a request for a subscription to a symmetric key with respect to the subject A;

generating, by the register R in response to the received request, a second symmetric key Y derived from both the first symmetric key X and a first value N; and transmitting, by the register R to the counterparty B, the second symmetric key Y generated by the register R.

The present invention advantageously provides a method and system to allow a counterparty 'B' to subscribe to a symmetric key with respect to a subject 'A' while preventing 'B's ability to impersonate the subject 'A' to other 'B's and to a register 'R'.

DETAILED DESCRIPTION OF THE INVENTION

Figure 1:
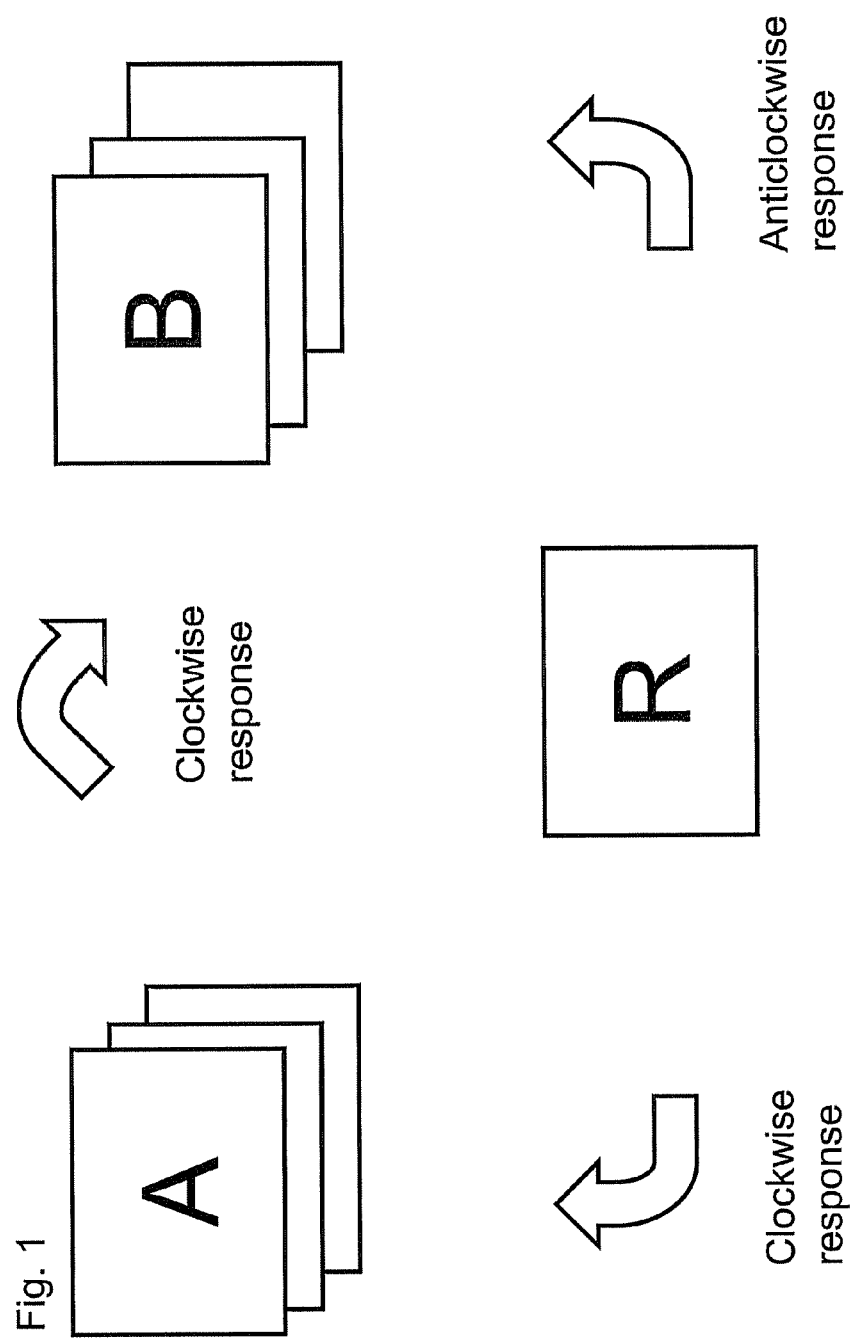
FIG. 1 is a block diagram detailing relationships in an identity scheme between a subject 'A', a counterparty 'B', and a register 'R', in accordance with embodiments of the present invention.

Viewed from a first aspect, the present invention provides a method to allow a counterparty 'B' to subscribe to a symmetric key with respect to a subject 'A' while preventing 'B's ability to impersonate the subject 'A' to other 'B's and to a register 'R'.

In one embodiment, 'R' and 'A' store, or derive, the same base symmetric key. A does this in or on the identity card or other possession or apparatus which 'A' possesses.

'R' uses a value and the base symmetric key to derive a further symmetric key which 'R' then provides, along with the value, to 'B'. In one embodiment, before providing the derived symmetric key to 'B', 'R' may encrypt the derived symmetric key with a public asymmetric key whose corresponding private asymmetric key is known only to 'B'.

Later, when 'R' determines that 'B' should no longer use that derived symmetric key for communication with 'A', 'R' advises or instructs 'B' to refrain from its use. Optionally, this instruction or advice might take the form of the provision of a new derived symmetric key with its accompanying value. In one embodiment, the value should be the same as before.

A particular advantage of the present invention applies when the possession is lost, stolen or damaged. 'A' will apply to 'R' for a replacement. When that happens, 'R' will derive a new symmetric key 'Y' (in one embodiment, using the same value of 'N') and, because a subscription exists, 'R' will notify, advise or instruct 'B' that the old symmetric key is now invalid.

Viewed from a second aspect, the present invention provides a method for subscribing to a symmetric key in an identity scheme, the method comprising the steps of: deriving, by a first entity, a second symmetric key from a first value and a first symmetric key which is associated with a second entity; receiving from the first entity the first value and the derived second symmetric key by a third entity; receiving the first value by the second entity from the third entity; and deriving by the second entity the second symmetric key from the first value and the first symmetric key.

In one embodiment, the present invention provides a method further comprising the steps of: the third entity encrypting transaction data using the second symmetric key, the second entity receiving the encrypted transaction data from the third entity, and the second entity decrypting the transaction data using the second symmetric key.

In one embodiment, the present invention provides a method further comprising the steps of: the second entity encrypting transaction data using the second symmetric key, the third entity receiving the encrypted transaction data from the second entity, and the third entity decrypting the transaction data using the second symmetric key.

In one embodiment, the present invention provides a method wherein the transaction data is encrypted and decrypted by the second and third entities using a symmetric key derived from the second symmetric key.

In one embodiment, the present invention provides a method, further comprising the steps of: identifying, by the first entity, that the first symmetric key is no longer associated with the second entity; and receiving, by the third entity, a notification that the second symmetric key can no longer be derived from any symmetric key associated with the second entity.

In one embodiment, the present invention comprises a method further comprising the step of receiving, by the third entity, a second value and a third symmetric key derived from the second value and from a symmetric key that replaces the first symmetric key that is no longer associated with the second entity.

In one embodiment, the present invention comprises a method wherein the first value and the second value are equal.

In one embodiment, the present invention provides a method wherein the first entity encrypts the second symmetric key with a public asymmetric key corresponding to a private asymmetric key which is known to the third entity before communicating the second symmetric key to the third entity.

Viewed from a third aspect, the present invention comprises a system for subscribing to a symmetric key in an identity scheme, the system comprising: a register component comprising means for deriving a second symmetric key from a first value and a first symmetric key which is associated with an identity card; an identity card comprising: means for storing the first symmetric key associated with the identity card, and means for deriving the second symmetric key from a received first value and the first symmetric key; and a counterparty component comprising means for receiving the second symmetric key and the first value.

Viewed from a fourth aspect, the present invention provides an identity card operable with a card reader, a register, or a counterparty, the identity card comprising: means for storing a first symmetric key associated with the identity card, means for deriving a second symmetric key from a received first value and the first symmetric key, and means for encrypting and decrypting transaction data using a symmetric key for performing the method steps as described above.

Viewed from a fifth aspect, the present invention provides a register operable with an identity card, a counterparty or a card reader, the register comprising: means for deriving a second symmetric key from a first value and a first symmetric key which is associated with an identity card for performing the steps of the method as described above.

Viewed from a sixth aspect, the present invention provides a card reader operable with an identity card, the card reader comprising: means for receiving transaction data from the identity card and means for sending transaction data and a first value to the identity card in order to perform the steps of the method as described above.

Viewed from a seventh aspect, the present invention comprises a counterparty operable with a register, a card reader, or an identity card, the counterparty comprising: means for receiving a second symmetric key and a first value and means for encrypting and decrypting transaction data using a symmetric key for carrying out the steps of the method as described above.

Viewed from an eighth aspect, the present invention provides a computer program product comprising a computer usable storage medium having a computer readable program code stored therein, said computer readable program code loadable into the internal memory of a digital computer and containing instructions that when executed by a processor of the digital computer implement one or more of the methods of the present invention.

FIG. 1 is a block diagram detailing the relationships in an identity scheme between a subject 'A', a counterparty 'B' and a register 'R', in accordance with embodiments of the present invention. The identity scheme comprises, as shown in FIG. 1, a plurality of subjects 'A', a plurality of counterparties 'B', a register (also known as an "identity provider") 'R' which records a set of facts about each 'A', and a set of technical mechanisms and business rules which permit the conveyance of identity responses from 'R' to 'B'. Thus, an identity response is a data structure representing a description (that is, a list of facts about) a particular 'A' which contains at least one more facts about 'A' than is necessary to comprise an identity; and an identity is a description (that is, a list of facts) which describes exactly one 'A'.

As shown in FIG. 1, 'A' is shown at the top left of FIG. 1 and 'B' is shown at the top right of FIG. 1 and a distinction exists between clockwise and anticlockwise identity responses. For example, facts about 'A' contained in or on A's identity card are an example of a clockwise response (because they flow from 'R' to 'B' via 'A'). 'R' might alternatively provide information directly to 'B', that is, anticlockwise, without the involvement of 'A'.

Some or all anticlockwise responses (by law, or by particular business rules of a scheme) may need 'A's consent and some others may not. 'A's consent might be either singular (that is, consenting to a single anticlockwise response from 'R' to 'B'), or continuing (that is, consenting to an unlimited number of anticlockwise responses within a consent's validity period.) 'A's consent is implicit in the nature of a clockwise response.

In FIG. 1, 'B's request to 'R' for an anticlockwise response can be a simple query in which 'B' gets a single answer. When 'A's consent is continuing, or when the law or the rules of the scheme do not require A's consent, 'B' has the alternative method of a subscription; i.e., 'B' can ask 'R' to provide an anticlockwise response immediately (just like a query), but in addition 'B' can request 'R' to let 'B' know when any of the facts in the response have changed.

The advantage to 'B' of the subscription method is that 'B' can make a new request when 'B' becomes aware from 'R's notification that facts have changed, so that 'B's knowledge of facts about 'A' is always in synchronization with 'R's knowledge of those facts, within the latency of the scheme. The latency of a scheme is the period of time required for the processes of notification and repeat subscription following a change in a fact.

There is a further advantage that 'B' does not need to contact 'R' every time 'B' needs to rely upon the content of an identity response. Instead, the continuing absence of a notification from 'R' implies that the most recent response that 'R' provided to 'B' about 'A' is still valid. There is a privacy benefit of subscriptions too; although 'R' will be aware that 'A' and 'B' have established some class of relationship, 'R' does not get to know how often 'A' and 'B' transact together. If 'B' uses only queries, rather than subscriptions, then 'R' will know whenever 'A' and 'B' transact; many privacy advocates express concern at this possibility.

One fact to which 'B' may wish to subscribe is the value of a symmetric key stored in an ID card or other possession held by 'A'.

A problem occurs when counterparty 'B' wishes to subscribe to such a symmetric key and when register 'R' wishes to prevent counterparty 'B' from impersonating 'A' to other counterparties 'B' and to the register 'R'.

In one embodiment, 'R' has issued 'A' with an ID card or other possession which, in addition to conveying any clockwise identity responses, is also capable of cryptographic operations. The possession might contain one or more symmetric keys, one or more asymmetric private keys, or a combination of symmetric keys and asymmetric private keys.

In one embodiment, 'A' has access to a personal card reader, either issued to 'A' by 'R' or obtained by 'A' from some other source. The possession and the card reader together enable 'A' to authenticate to 'R' when 'A' and 'R' transact; for example, when 'A' makes a request for 'R' to show to 'A' the information that 'R' holds on 'A'. 'R' provides a challenge (for example, a randomly generated number of sufficient entropy) to 'A'. 'A' enters this challenge into the personal card reader, the possession uses a symmetric key 'X' to generate a response, the personal card reader displays the response to 'A', and 'A' communicates the response to 'R'. If 'R' has arranged that only that particular possession contains that particular symmetric key 'X', then 'A' has demonstrated to 'R' over the telephone, for example, or over an Internet session, that the possession is in A's custody. 'R' must know (or be able to derive) the symmetric key 'X' that 'A's possession used in its computation.

Note that the key used must be symmetric if the card reader is unconnected to any other equipment. Use of an asymmetric key pair in that circumstance is infeasible, because the response produced to any challenge contains a sequence of digits which is unreasonably long for a human subject 'A' to handle, and, if truncated, cannot be verified by 'R'.

Now consider the use of card readers generally within an identity scheme, where the requirement is for 'A' to authenticate not to 'R' but instead to a plurality of 'B's. To gain the benefits outlined earlier, each such 'B' needs to subscribe through 'R' to a symmetric key.

In the case of asymmetric public keys, there are no constraints (other than any requirement for 'A's consent) which limit 'R' in responding to a subscription request from 'B' for the public key matching the private key contained in 'A's possession. Public key cryptography has the property that the subject's public key can be shared among an unlimited number of counterparties without any of them being able to impersonate the subject. There is no reason, therefore, why the public key should not be regarded as an ordinary fact which any 'B' can subscribe to.

With symmetric keys, the position is very different. If 'R' were to provide 'B' with the value of a symmetric key 'X' in an 'A's possession, then 'B' could impersonate 'A' to other 'B's and to 'R'.

A response to this problem is that 'R' refuses 'B's subscription to symmetric keys, instead requiring 'B' to pass each of 'A's responses for examination by 'R' as they happen. This, however, negates the benefits of the subscription approach, because 'B' must contact 'R' every time 'A' and 'B' transact. A solution to this problem is described infra.

In one embodiment, an identity scheme comprises a register 'R' which holds data associated with a person 'A', an identity card which stores a symmetric key 'X' unique to 'A', a card reader that transmits data to the identity card and receives data from the identity card, and a counterparty 'B' that the person 'A' transacts with. Note that a personal card "reader" both reads from the identity card and writes to it.

The register 'R' and the counterparty 'B' both comprise software applications that run on computer systems in order to maintain data about a person 'A' and to allows a person 'A' to transact with another party 'B' and vice versa. These software applications may comprise database application or other storage and retrieval mechanisms. An example of one such computer system is shown with reference to FIG. 2.

Figure 2:
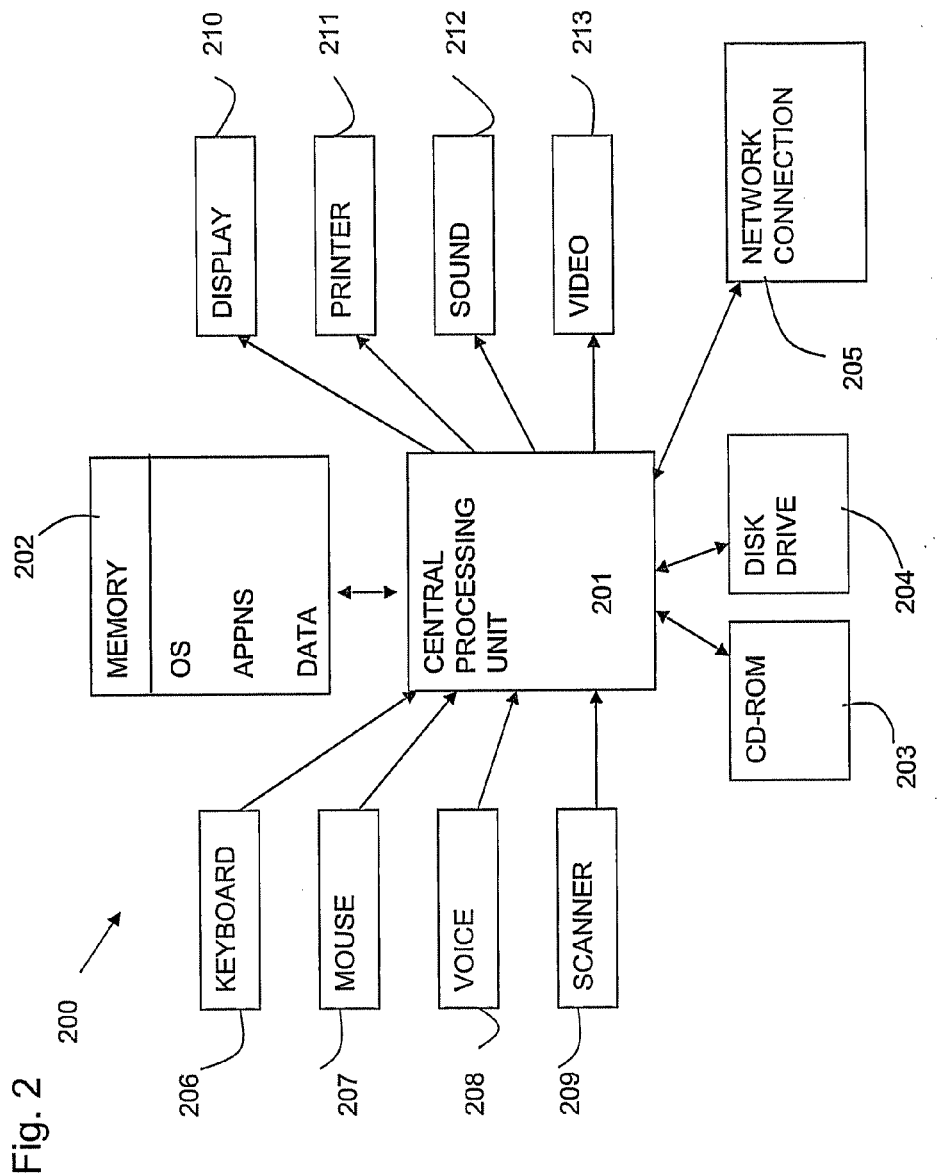
FIG. 2 is a block diagram showing the components of a computer system, in accordance with embodiments of the present invention.

FIG. 2 is a block diagram showing the components of a computer system 200, in accordance with embodiments of the present invention. In FIG. 2, the computer system 200 has a central processing unit 201 with primary storage in the form of memory 202 (RAM and ROM). The memory 202 stores program information and data acted on or created by application programs. The program information includes the operating system code for the computer system 200 and application code for applications running on the computer system 200. Secondary storage includes optical disk storage 203 and magnetic disk storage 204. Data and program information can also be stored and accessed from the secondary storage.

The computer system 200 includes a network connection means 205 for interfacing the computer system 200 to a network such as a local area network (LAN) or the Internet. The computer system 200 may also have other external source communication means such as a fax modem or telephone connection.

The central processing unit 201 comprises inputs in the form of, as examples, a keyboard 206, a mouse 207, voice input 208, and a scanner 209 for inputting text, images, graphics or the like. Outputs from the central processing unit 200 may include a display means 210, a printer 211, sound output 212, video output 213, etc.

In a distributed system, a computer system 200, as shown in FIG. 2, may be connected via the network connection 205 to a server (not shown) on which applications may be run remotely from the central processing unit 201.

Applications may run on the computer system 200 from a storage means 203, 204 or via a network connection 205, which may include database applications for providing, for example, an identity register in which the identity register 'R' communicates over the network with a counterparty 'B'. The applications may also represent a counterparty 'B' which communicates over the network with 'R' and with an identity card in the possession of 'A'. The identity register 'R' stores information associated with the identity card and a counterparty 'B'. The counterparty 'B' interacts with the identity card and the card reader when 'A' wishes to initiate a transaction with 'B' or vice versa.

Figure 3:
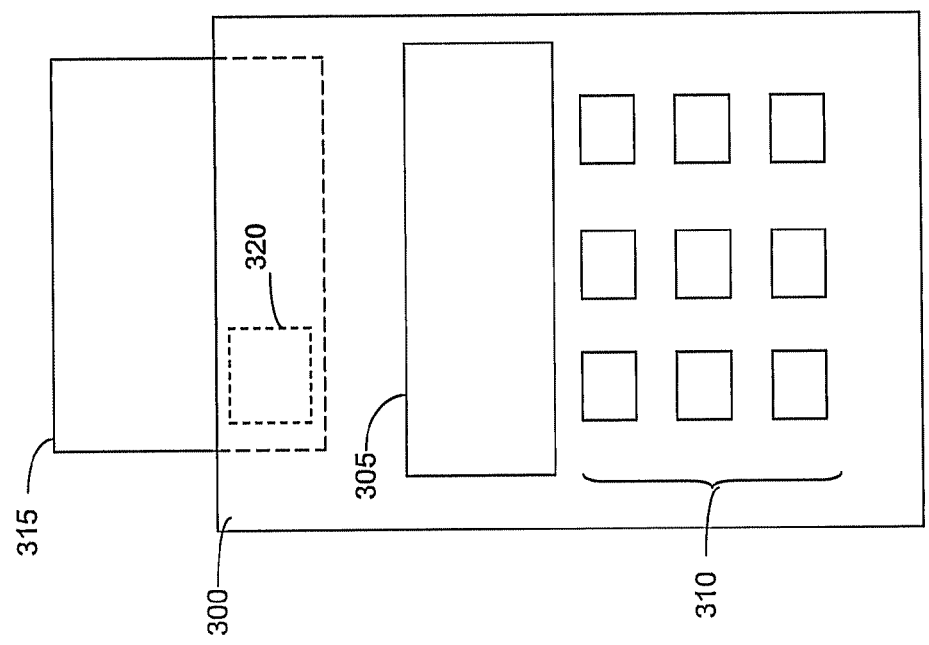
FIG. 3 is a block diagram of a card reader which is operable for use with embodiments of the present invention.

FIG. 3 is a block diagram of a card reader 300 which is operable for use with embodiments of the present invention. The computer system 200 of FIG. 2 interfaces with the card reader 300 which is operable for use with an identity card 315 having a programmable chip 320. For example, a card 315 may be a card for identifying a person in possession of the card. A card reader 300 may be a wirelessly connected card reader 300 (such as a RFID reader) or one which is hardwired to a network for interfacing with the computer system 200 of FIG. 2 or the card reader 300 may connect to the computer system 200 by means of information intermediated by the person 'A'.

The card reader 300, comprises a screen 305 for reading prompts generated by the card reader 300 (although in some card readers the screen may be optional), a keypad or other data input means 310 such as a biometric input means and a receiving means for receiving an identity card 315. In one embodiment, the receiving means comprises engaging means for engaging the identity card in a position such that the programmable chip 320 on the identity card 315 engages with a reading means for reading data from and writing data to the programmable chip 320. However, it will be obvious to a person skilled in the art that other implementations of a card and card reader are possible without departing from the scope of the invention. For example, the card reader 300 may be in the form of an RFID reader and the identity card 315 may be in the form of an RFID chip, or the identity card and the reader may be integrated into a single device. Alternatively, the identity card may comprise a software application operable with a computer and interacting with a software application at the register 'R' and/or the counterparty 'B' computer system.

'R' must know (or be able to derive or obtain) the symmetric key that 'A's identity card uses when 'A' communicates with 'R'. Although it would be possible for 'R' to set up a secure data file containing entries for each 'A' such that each entry contains the value of the relevant symmetric key, practical systems are not usually implemented in this way. Instead, in accordance with embodiments of the present invention, 'R' may store a highly protected secret value 'S' whose secrecy is protected by 'R', and uses this highly protected secret value 'S' and a general value 'G' relating to 'A' to derive a symmetric key for 'A'. This general value 'G' need not be specially protected but might for example be the serial number of 'A's ID card or other possession. So, for example, 'R' might derive 'A's base symmetric key 'X' by encrypting 'A's ID card serial number (as representing the general value 'G') with the highly-protected secret value 'S'.

In accordance with embodiments of the present invention, the above principle is extended by recursion. The recursion operates on a base symmetric key 'X' derived in the manner just described (or, if somehow practical, stored in a secure data file that 'R' maintains). 'R' ensures that 'A's ID card or other possession contains, or can derive or obtain, the symmetric key 'X'.

When 'B' requests 'R' for a subscription to a symmetric key with respect to 'A', 'R' derives a new symmetric key 'Y' from a general variable 'N' and the base symmetric key 'X' for 'A'. In one embodiment, 'N' is simple. For example, if this is the tenth time in the history of R's relationship with 'A' that any counterparty 'B' has requested a subscription to a symmetric key for 'A', then 'N' will be the number 10, which means that N such subscription requests have been received collectively from M unique counterparties 'B' such that M may be any integer satisfying 1≤M≤N. For example, if M=1 then all N requests have been received from a single counterparty 'B'. As another example, if M=N then each request of the N requests has been received from a different counterparty 'B'. 'R' may use 'A's identity card serial number and the highly protected secret value 'S' to derive a value 'X', and will then use 'X' and the value 'N' to derive a symmetric key 'Y'. 'R' will then transmit to 'B' the two values 'N' and 'Y'. 'R' may encrypt 'Y' with a public key whose matching private key is known only by 'B'.

When 'A' communicates with 'R', the value 'X' will be used as the symmetric key as before. However, when 'A' communicates with 'B', the value 'Y' will be used as the symmetric key.

The nature of the subscription is that 'R' will notify 'B' when 'B' should no longer use the derived key 'Y'. 'R's notification to 'B' may be a simple advice or instruction to desist from the use of 'Y', or it might be the replacement symmetric key. Where 'R' sends 'B' a simple desistance advice or instruction, it might be followed later by a request from 'B' to 'R' for a subscription to the new symmetric key.

With the present invention, 'R' is a trusted party. The present invention allows 'R' to impersonate 'A' to 'B', but does not allow any 'B' to impersonate 'A' to 'R' or to another 'B'.

Figure 4:
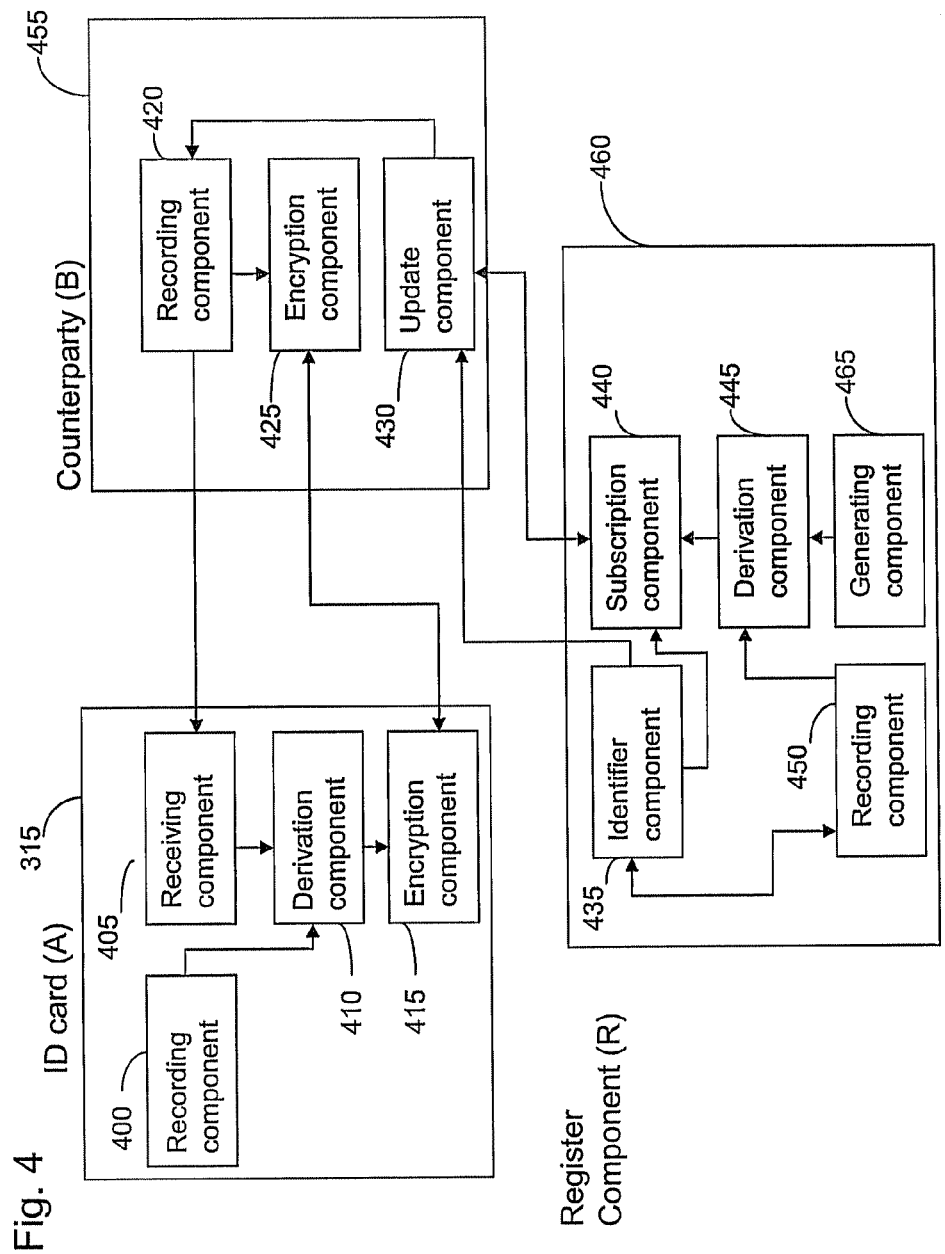
FIG. 4 is a block diagram showing the interaction between an ID card, a counterparty 'B', and a register 'R', in accordance with embodiments of the present invention.

FIG. 4 is a block diagram showing the interaction between an ID card 315 'A', a counterparty 455 'B', and a register 460 'R', in accordance with embodiments of the present invention. FIG. 4 shows how the above concepts operate with an identity scheme where 'R' is a provider of an identity register, 'B' is the counterparty, and 'A' is a person in possession of an identity card 315 and a card reader 300 or some other type of device capable of storing a symmetric key and encrypting and decrypting data.

With reference to FIG. 4, an identity card 315, the counterparty component 455 and the register component 460 are shown along with each of their respective subcomponents. Each of these components and their respective subcomponents interacts and interfaces with each other in order to provide the advantages of the present invention.

In one embodiment, an identity card 315 is a card which stores a symmetric key 'X' on the programmable computer chip 320. The programmable computer chip 320 also comprises components which allow for the derivation of a symmetric key that the identity card 315 will use to transact with 'B'.

The programmable computer chip 320 comprises a recording component 400 for storing a base symmetric key or for recording information which enables the identity card 315 to derive the base symmetric key The identity card 315 comprises a recording component 400; a receiving component 405 for receiving a generated value 'N' from the recording component 400 of the counterparty component 455; a derivation component 410 for deriving a second symmetric key 'Y' from a first symmetric key 'X' and the generated value 'N'; and an encryption component 415 for encrypting or decrypting data using the second symmetric key 'Y'. Whether the encryption component 415 decrypts or encrypts using the second symmetric key 'Y' depends on the application being used. However, if encryption component 415 encrypts using the second symmetric key 'Y' then encryption component 425 decrypts using the second symmetric key 'Y' and vice versa.

The counterparty component 455 comprises a recording component 420 for recording information received from the register component 460, such as the generated value and the second symmetric key, an encryption component 425 for encrypting or decrypting data using the second symmetric key 'Y' when 'A' transacts with 'B', and an update component 430 for receiving a third symmetric key from the register component 460 when, for example, the ID card storing the previous symmetric key has been lost or stolen.

The register component 460 comprises an identifier component 435 for identifying when a new symmetric key is assigned to the identity card 315 and for informing the update component 430 of the counterparty 455 'B' that a new symmetric key has been assigned to the identity card; a subscription component 440 for storing subscriptions to symmetric keys from a counterparty 'B' 455 for each identity card 315 instance; a derivation component 445 for deriving a second symmetric key from a first symmetric key and a general value; a generation component 465 for generating a general value for an identity card 315, and a recording component 450.

Each of the recording components 400, 450 either record the same symmetric key 'X' or they record information which enables them to derive the same symmetric key. If an identity card 315 is lost or damaged, or a new identity card is issued, then each of the recording components 400, 450 will once again both store the same key.

When the register component 460 identifies that the first symmetric key 'X' should no longer be associated with the identity card 315 in the possession of 'A', the register component 460 transmits to the counterparty 'B' a notification that the second symmetric key 'Y' should no longer be used. Further, counterparty 'B' may then receive a second value and a third symmetric key derived from the second value and from a symmetric key that replaces the first symmetric key that is no longer associated with 'A's identity card. The first general value and the replacement value can be equal. In one embodiment, the register component 460 encrypts the second symmetric key with a public asymmetric key corresponding to a private asymmetric key which is known to the counterparty 'B' before the second symmetric key is communicated to counterparty 'B'.

The identifier component 435 identifies when a new symmetric key 'X' has been issued and assigned to the new identity card 315, and transmits the new derived symmetric key 'Y' to the recording component 420 of the counterparty 455 which ensures that the identity card 315 can derive the same symmetric key 'Y' as the counterparty 455 stores. When there is more than one identity card 315 in operation, the counterparty 455 may store many instances of derived symmetric keys 'Y'.

When a new counterparty 455 instance requests a subscription with respect to a given identity card 315 instance, the generation component 465 of the register component 460 generates a value 'N' that it has not generated before for that particular identity card 315 and passes the generated value 'N' to the derivation component 445. The derivation component 445 uses the generated value 'N' and the assigned symmetric key 'X' to derive a second symmetric key 'Y' and transmits the second symmetric key 'Y' to the subscription component 440 along with the generated value 'N'. The subscription component 440, on receipt of the second symmetric key 'Y' and the generated value 'N', transmits this information to the update component 430 of the counterparty component 455 which in turn sends the transmitted information ('N' and 'Y') to the recording component 420 for storing.

Each time 'A' who is in the possession of an identity card 315 wishes to transact with counterparty 'B', the encryption component 415 encrypts or decrypts data using the second symmetric key and the encryption component 425 of the counterparty component 455 decrypts or encrypts that data the second symmetric key. The order in which these two operations are executed depends on the nature of the transaction.

However, in order to encrypt or decrypt using the second symmetric key, the encryption component 415 must first know the generated value that was generated by the generation component 465 of the register component 460. Thus the recording component 420 transmits the generated value to the receiving component 405 of the identity card 315 before each encryption or decryption performed by encryption component 415. The receiving component 405 transmits the generated value to the derivation component 410, and the recording component 400 transmits to the derivation component 410 the first symmetric key 'X', and the derivation component 410 derives the same second symmetric key 'Y' that the derivation component 445 derived.

Figure 5:
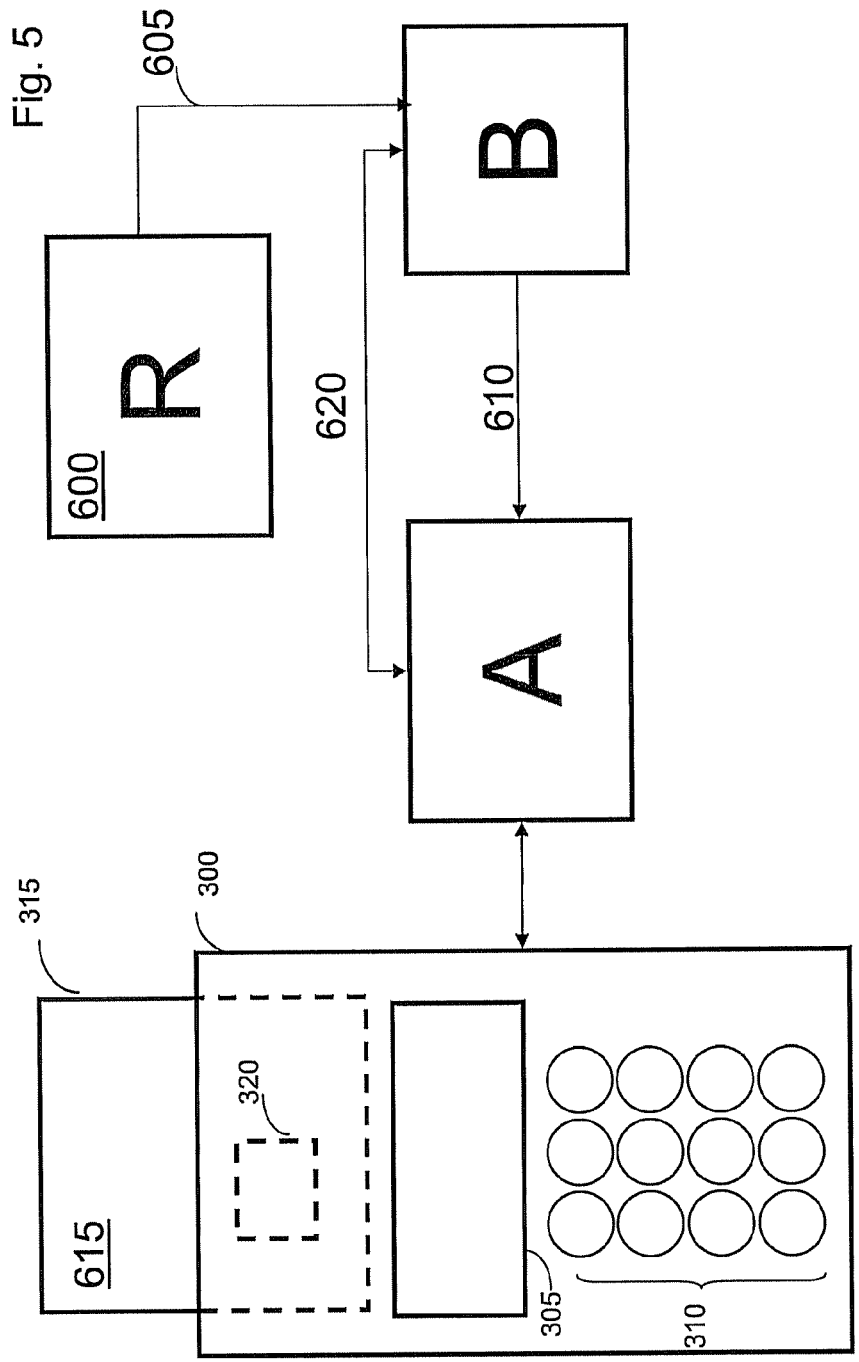
FIG. 5 is a block diagram illustrating the use of a card reader, in accordance with embodiments of the present invention.
Figure 6:
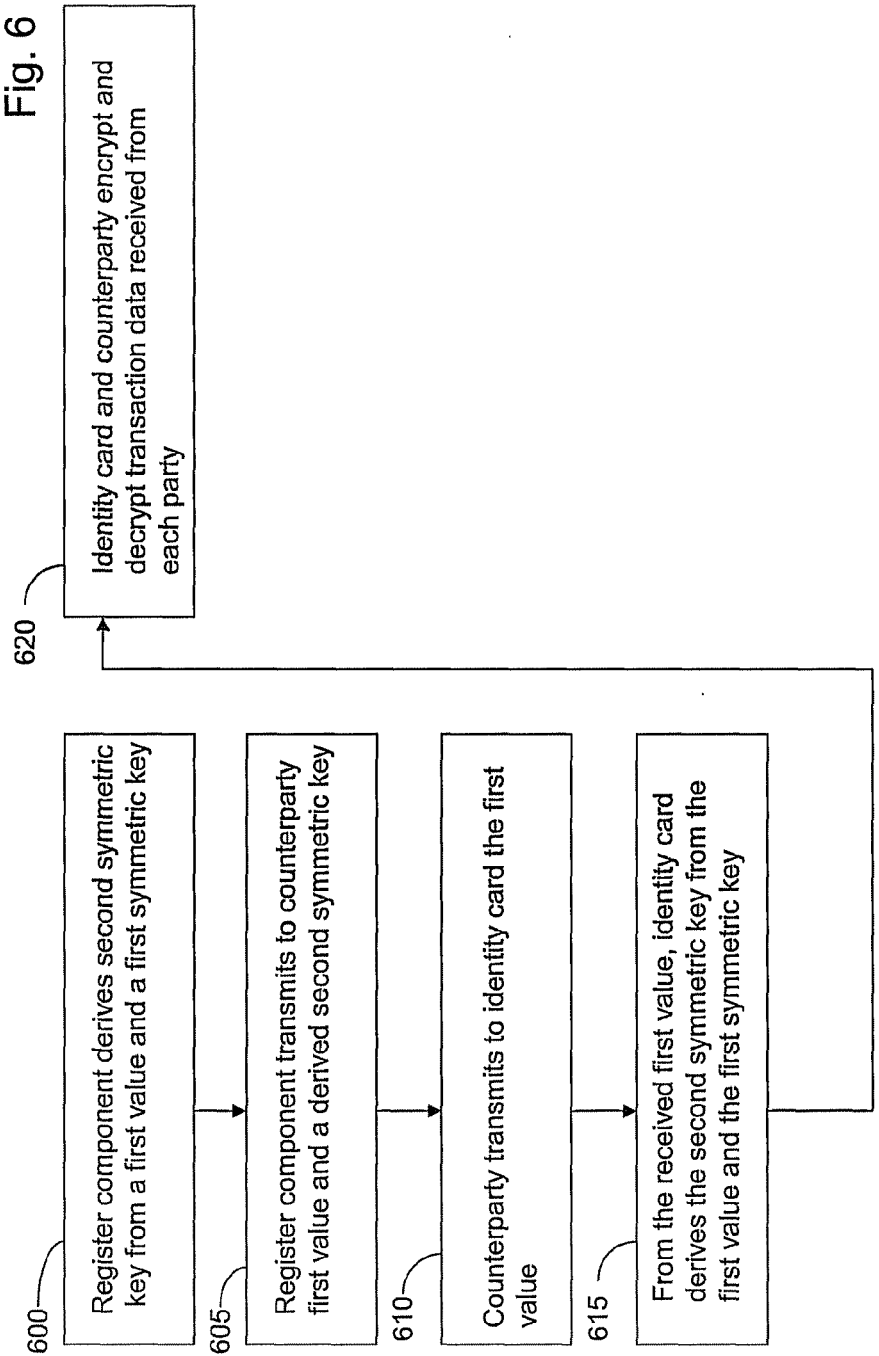
FIG. 6 is a flow chart detailing the operational steps of a method according to embodiments of the present invention.

FIG. 5 is a block diagram illustrating the use of a card reader 300, in accordance with embodiments of the present invention. FIG. 5 (and with reference to FIG. 6) gives an example sequence of events using an ID card 315 and the card reader 300. FIG. 6 is a flow chart detailing the operational steps of a method according to embodiments of the present invention.

At step 600, the register component 'R' derives a second symmetric key 'Y' from a first value 'N' and a first symmetric key 'X', wherein the first symmetric key 'X' is associated with the identity card 315 in possession of 'A'.

At step 605, the register component 'R' transmits to the counterparty 'B' the first value 'N' and the derived second symmetric key 'Y'.

At step 610, the counterparty 'B' also transmits to the identity card 315 the first value 'N' that the counterparty 'B' received from the register component 'R'.

From the received data, the identity card 315 derives the second symmetric key 'Y' from the first value 'N' and the first symmetric key 'X', at step 615.

Once the second symmetric key 'Y' has been derived by the identity card 315, the identity card 315 and the counterparty 'B' are able to transact with each other by encrypting or decrypting transaction data received from either of the parties using the derived second symmetric key 'Y', at step 620.

The recursion from 'X' to 'Y' can operate further. For example, instead of subscribing to 'R', 'B2' might subscribe to 'B' for a symmetric key 'Z' which 'B' derives from 'Y' and a new value 'M'. 'B2' will send 'A' the quantities 'N', 'M' and a challenge. The ID card or other possession will use the values 'N' and 'X' to derive 'Y', 'Y' and 'M' to derive 'Z', and 'Z' to compute the response. In this situation, 'R' and 'B' can impersonate 'A' to 'B2'). Further recursion still is limited only by 'A's patience in entering a string of values ('N', 'M', . . . ).

In one embodiment, the register component 'R' decides on a first value and transmits the first value 'N' to the counterparty 'B' along with the derived second symmetric key 'Y'. The counterparty 'B' is then able to provide the first value to the identity card in the possession of 'A'.

However, it will be appreciated by a person skilled in the art, that other flows of the first value to the counterparty 'B' and the identity card 315 are possible.

For example, it is possible for any one of the counterparties 'B', the register 'R,' and the identity card in the possession of 'A' to generate the first value 'N'. Thus, whoever generates the value 'N' can transmit the value 'N' to other parties in either a clockwise direction or an anticlockwise direction. If value 'N' is only transmitted to the register 'R' or the identity card 315, then the receiving party must pass the value 'N' to the counterparty 'B'. If the counterparty 'B' or the identity card generates the value 'N', then there is no need for the generating party to receive the value 'N'. However, in this case the register 'R' will need to receive the value 'N'.

Further, in one embodiment, the register 'R' must know the value 'N' before the identity card can derive the second symmetric key and it is possible that the counterparty 'B' need never know the value 'N' unless it needs the value 'N' to transmit it to the identity card. In another embodiment, the general value is communicated by the register 'R' to an intermediary who communicates the general value and the second symmetric key 'Y' to the relevant parties.

The present invention provides a process for providing a symmetric key subscription service, said process comprising implementing a method for symmetric key subscription. The subscription service provides for subscribing to a symmetric key in an identity scheme.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for symmetric key subscription, said method comprising:

receiving, by the register R from a counterparty B, a request for a subscription to a symmetric key with respect to the subject A, said receiving the request having been performed after a possession has been issued by the register R to the subject A, said possession storing a first symmetric key X or comprising a deriving means configured to derive the first symmetric key X, said receiving the request performed by a processor of a computer system;

said processor generating, by the register R in response to the received request, a second symmetric key Y derived from both the first symmetric key X and a first value N, said N being a positive integer; and said processor transmitting, by the register R to the counterparty B, the second symmetric key Y generated by the register R.

2. The method of claim 1, wherein said transmitting comprises transmitting, by the register R to the counterparty B, the second symmetric key Y generated by the register R and the first value N.

3. The method of claim 2, wherein the method further comprises:

sending, by the counterparty B to the subject A, the first value N after the counterparty B received the first value N that had been transmitted by the register R.

4. The method of claim 3, wherein the method further comprises:

obtaining, by the subject A, the first symmetric key X by retrieving the stored first symmetric key X if the possession stores the first symmetric key or by using the deriving means to derive the first symmetric key X if the possession comprises the deriving means; and generating, by the subject A after having received the first value N from the counterparty B and after having obtained the first symmetric key X, the second symmetric key Y derived from both the obtained first symmetric key X and the first value N received from the counterparty B.

5. The method of claim 4, wherein the method further comprises after said generating by the subject A the second symmetric key Y: transacting data from a first entity to a second entity, wherein either the first entity is the subject A and the second entity is the counterparty B or the first entity is the counterparty B and the second entity is the subject A, and wherein said transacting data comprises:

the first entity encrypting transaction data using the second symmetric key Y;

the first entity sending the encrypted transaction data to the second entity;

the second entity receiving the encrypted transaction data sent by the first entity; and the second entity decrypting the received encrypted transaction data using the second symmetric key Y to obtain the transaction data.

6. The method of claim 1, wherein N denotes an Nth time in a history of R's relationship with A that any counterparty has requested a subscription to a symmetric key with respect to the subject A.

7. The method of claim 1, wherein the possession is an identity card.

8. A computer system comprising a processor and a computer readable memory unit coupled to the processor, said memory unit containing program code that when executed by the processor implement a method for symmetric key subscription, said method comprising:

said processor receiving, by a register R from a counterparty B, a request for a subscription to a symmetric key with respect to a subject A, said receiving the request having been performed after a possession has been issued by the register R to the subject A, said possession storing a first symmetric key X or comprising a deriving means configured to derive the first symmetric key X;

said processor generating, by the register R in response to the received request, a second symmetric key Y derived from both the first symmetric key X and a first value N, said N being a positive integer; and said processor transmitting, by the register R to the counterparty B, the second symmetric key Y generated by the register R.

9. The computer system of claim 8, wherein the method further comprises:

receiving, by the counterparty B, the first value N after said transmitting the second symmetric key Y by the register R.

10. The computer system of claim 9, wherein the method further comprises:

sending, by the counterparty B to the subject A, the first value N after the counterparty B received the first value N.

11. The computer system of claim 10, wherein the method further comprises:

obtaining, by the subject A, the first symmetric key X by retrieving the stored first symmetric key X if the possession stores the first symmetric key or by using the deriving means to derive the first symmetric key X if the possession comprises the deriving means; and generating, by the subject A after having received the first value N from the counterparty B and after having obtained the first symmetric key X, the second symmetric key Y derived from both the obtained first symmetric key X and the first value N received from the counterparty B.

12. The computer system of claim 11, wherein the method further comprises after said generating by the subject A the second symmetric key Y: transacting data from a first entity to a second entity, wherein either the first entity is the subject A and the second entity is the counterparty B or the first entity is the counterparty B and the second entity is the subject A, and wherein said transacting data comprises:

the first entity encrypting transaction data using the second symmetric key Y;

the first entity sending the encrypted transaction data to the second entity;

the second entity receiving the encrypted transaction data sent by the first entity; and the second entity decrypting the received encrypted transaction data using the second symmetric key Y to obtain the transaction data.

13. A computer program product, comprising a computer readable storage device having a computer readable program code stored therein, said computer readable program code containing instructions that when executed by a processor of a computer system implement a method for symmetric key subscription, said method comprising:

said processor receiving, by a register R from a counterparty B, a request for a subscription to a symmetric key with respect to a subject A, said receiving the request having been performed after a possession has been issued by the register R to the subject A, said possession storing a first symmetric key X or comprising a deriving means configured to derive the first symmetric key X;

said processor generating, by the register R in response to the received request, a second symmetric key Y derived from both the first symmetric key X and a first value N, said N being a positive integer; and said processor transmitting, by the register R to the counterparty B, the second symmetric key Y generated by the register R.

14. The computer program product of claim 13, wherein the method further comprises:

receiving, by the counterparty B, the first value N after said transmitting the second symmetric key Y by the register R.

15. The computer program product of claim 14, wherein the method further comprises:

sending, by the counterparty B to the subject A, the first value N after the counterparty B received the first value N.

16. The computer program product of claim 15, wherein the method further comprises:

obtaining, by the subject A, the first symmetric key X by retrieving the stored first symmetric key X if the possession stores the first symmetric key or by using the deriving means to derive the first symmetric key X if the possession comprises the deriving means; and generating, by the subject A after having received the first value N from the counterparty B and after having obtained the first symmetric key X, the second symmetric key Y derived from both the obtained first symmetric key X and the first value N received from the counterparty B.

17. The computer program product of claim 16, wherein the method further comprises after said generating by the subject A the second symmetric key Y: transacting data from a first entity to a second entity, wherein either the first entity is the subject A and the second entity is the counterparty B or the first entity is the counterparty B and the second entity is the subject A, and wherein said transacting data comprises:

the first entity encrypting transaction data using the second symmetric key Y;

the first entity sending the encrypted transaction data to the second entity;

the second entity receiving the encrypted transaction data sent by the first entity; and the second entity decrypting the received encrypted transaction data using the second symmetric key Y to obtain the transaction data.

18. A process for providing a symmetric key subscription service, said process comprising implementing a method for symmetric key subscription, said method comprising:

receiving, by the register R from a counterparty B, a request for a subscription to a symmetric key with respect to the subject A, said receiving the request having been performed after a possession has been issued by the register R to the subject A, said possession storing a first symmetric key X or comprising a deriving means configured to derive the first symmetric key X, said receiving the request performed by a processor of a computer system;

said processor generating, by the register R in response to the received request, a second symmetric key Y derived from both the first symmetric key X and a first value N, said N being a positive integer; and said processor transmitting, by the register R to the counterparty B, the second symmetric key Y generated by the register R.

19. The process of claim 18, wherein said transmitting comprises transmitting, by the register R to the counterparty B, the second symmetric key Y generated by the register R and the first value N.

20. The process of claim 19, wherein the method further comprises:

sending, by the counterparty B to the subject A, the first value N after the counterparty B received the first value N that had been transmitted by the register R.

21. The process of claim 20, wherein the method further comprises:

obtaining, by the subject A, the first symmetric key X by retrieving the stored first symmetric key X if the possession stores the first symmetric key or by using the deriving means to derive the first symmetric key X if the possession comprises the deriving means; and generating, by the subject A after having received the first value N from the counterparty B and after having obtained the first symmetric key X, the second symmetric key Y derived from both the obtained first symmetric key X and the first value N received from the counterparty B.

22. The process of claim 21, wherein the method further comprises after said generating by the subject A the second symmetric key Y: transacting data from a first entity to a second entity, wherein either the first entity is the subject A and the second entity is the counterparty B or the first entity is the counterparty B and the second entity is the subject A, and wherein said transacting data comprises:

the first entity encrypting transaction data using the second symmetric key Y;

the first entity sending the encrypted transaction data to the second entity;

the second entity receiving the encrypted transaction data sent by the first entity; and the second entity decrypting the received encrypted transaction data using the second symmetric key Y to obtain the transaction data.

* * * * *